3,369,908
PROCESS FOR PRODUCING TORTILLA FLOUR
Roberto M. Gonzalez, 5 de Mayo 32 Norte, Mazatlan, Sinaloa, Mexico, and Manuel J. Rubio, 192 Benham Ave., Bridgeport, Conn. 06605
Filed Apr. 2, 1965, Ser. No. 445,198
8 Claims. (Cl. 99—93)

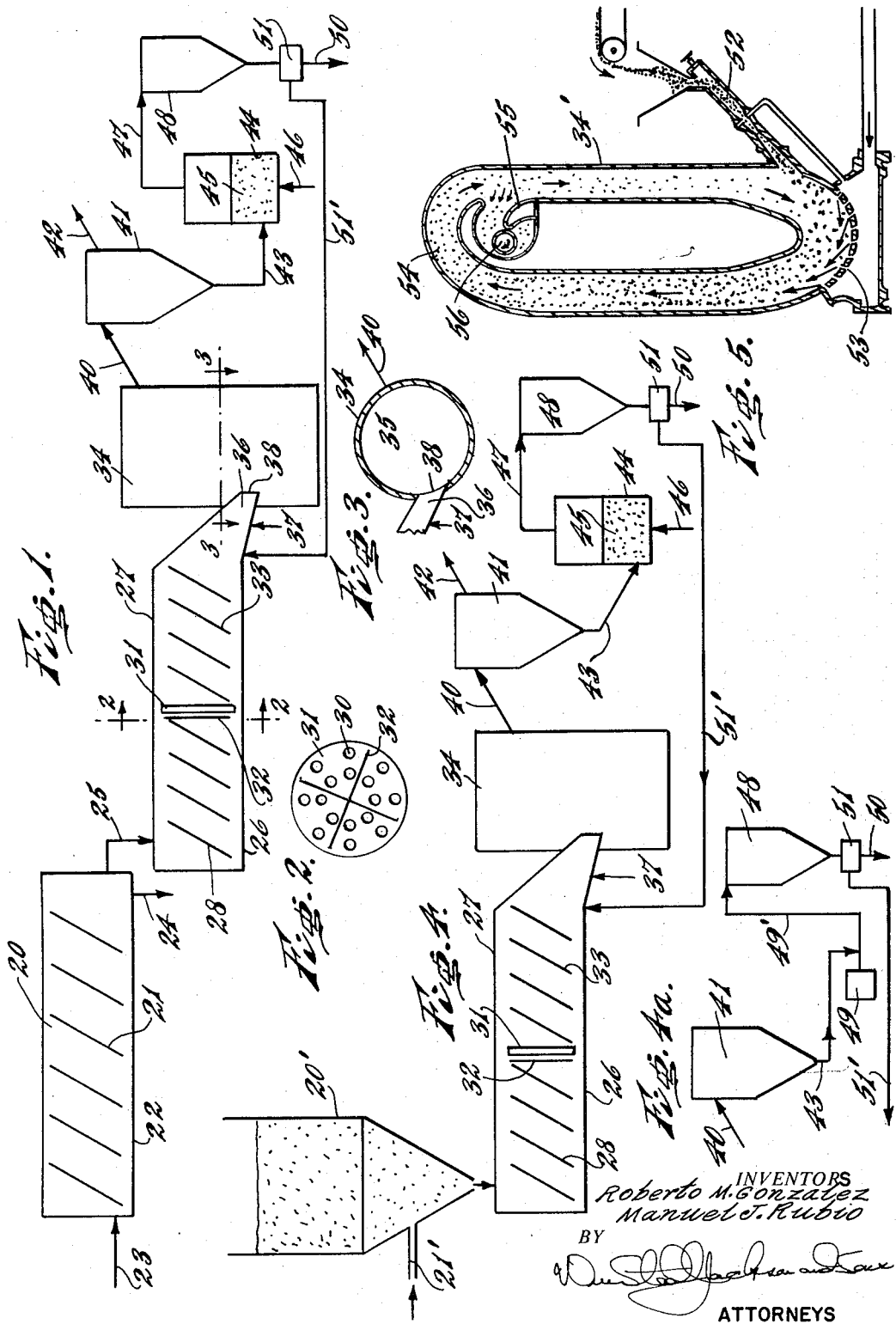

ABSTRACT OF THE DISCLOSURE

Process of making tortilla flour wherein whole grain corn is steeped in heated water containing calcium oxide for a time sufficient to render the hull greasy without removing it, removed from said water, introduced into a stream of pressurized, hot, non-combustible gas and progressed in a return loop to: impinge corn particles against each other, grind and partially dry the resulting flour, separating said gas and flour and finally drying said flour to a moisture content of about 12%.

---

The present invention relates to a process for producing nixtamalized corn meal for the production of tortillas.

A purpose of the invention is to produce tortilla flour which will make tortillas having better taste and more pleasing odor.

A further purpose is to produce tortilla flour of greater keeping quality.

A further purpose is to produce tortilla flour which has greater plasticity and produces dough of better elasticity, absorbing more moisture and commanding a premium price.

A further purpose is to avoid the compressed glossy surface which has characterized the granules in tortilla flour of the prior art.

A further purpose is to so conduct the cooking of the corn as to obtain a grain which can be ground by impact on other grains in a flowing gas stream.

A further purpose is to produce tortilla flour which is more uniform in size of particle and moisture content.

A further purpose is to avoid localized overheating during grinding and drying which will impair the quality of the flour.

A further purpose is to shorten the overall treatment time of tortilla flour during production.

A further purpose is to grind both the hull and the kernel so as to increase the food value.

A further purpose is to avoid loss of polysaccharides and proteins from the flour.

A further purpose is to remove part of the water from the flour during grinding operation and optionally to remove the remaining water down to a desired final moisture content and at the same time cool the flour in a fluid bed or in a gas lift.

A further purpose is to increase the yield of nixtamalized corn meal per unit of weight of corn grains.

Further purposes appear in the specification and in the claims.

In the drawings we have chosen to illustrate a few only of the embodiments in which the invention may appear, selecting the forms shown from the standpoints of convenience in illustration, satisfactory operation and clear demonstration of the principles involved.

FIGURE 1 is a diagrammatic illustration of equipment to carry out the process of the invention.

FIGURE 2 is a diagrammatic section of FIGURE 1 on the line 2—2.

FIGURE 3 is a diagrammatic section of FIGURE 1 on the line 3—3.

FIGURE 4 is a diagrammatic illustration of a variant form of mechanism of the invention.

FIGURE 4a is a diagrammatic illustration of a variation in the mechanism shown in FIGURE 4.

FIGURE 5 is a diagrammatic vertical section of a modified device for grinding the corn grains.

Describing in illustration but not in limitation and referring to the drawings:

Tortilla flour is an ancient food widely used, particularly in Mexico before the Spanish conquest.

Originally dry corn was placed in a receptacle on a fire and water and lime or ash was added. The product was heated until it reached a high temperature and held at this temperature for a variable time and then removed from the fire and set aside to cool. The cooking liquid was drained off and the corn which had by that time reacted with the lime was said to be nixtamalized, meaning that a reaction of the lime with the cellulose and proteins had taken place. The corn was then ground in a stone grinder and converted into a mash from which the tortillas were made by cooking on a hot earthenware or iron griddle.

At the present time in Mexico small manufacturers produce tortilla dough which is sold to housewives.

The dough decomposes readily by fermentation in a hot climate and spoilage is one of the causes of the commonplace intestinal disturbances encountered by the people in this area. Industrial plants also produce nixtamalized dry corn meal which has somewhat better keeping qualities than that made by the small manufacturers. In the industrial plants the corn meal is steeped in a batch under controlled pH, temperature and time for a period of one to three hours.

The steeped corn grains are in the prior art ground in a hammermill, impact mill or attrition mill in which the product is reduced to its final particle size in a moist condition. The moisture content at the beginning of grinding in the prior art has varied between 30 and 50% by weight.

The ground product in the prior art has been discharged into a vertical separator by means of a fan which further subdivides it and circulates preheated air through the corn to dry it. The product collected by the separator is screened and coarse particles are recycled while fine particles are screened out and form the final product having a moisture content of 12–13% by weight.

Prior experiments were made to improve the process of grinding, and among other things grinding in a gas-borne stream and has been tried, but the results were not satisfactory as the flour was gelatinized and was unsuitable for tortillas.

The present invention involves a much improved process for producing tortilla flour. The improvements are both in the quality of the flour itself and also in the processing techniques.

One of the great advantages of the present invention is that the flour has better taste and better odor.

Another important advantage of the invention is that the tortilla flour has improved keeping qualities. A sample of tortilla flour produced according to the invention has been stored for four months exposed to the atmosphere in warm weather without rancidity and without insect infestation.

Another important advantage of the flour of the present invention is that it has higher plasticity and the dough obtained from it has higher elasticity. These characteristics are very important in mechanizing the equipment for making tortillas. In prior art practice the moisture absorbing power of tortilla flour has been about 1.25 times the weight. The product of the invention has a moisture absorbing power of better than 1.4 and in many cases as much as 1.45 or even 1.50 times the weight. Because of the large moisture absorbing quality and the resultant plasticity and elasticity, a premium price can be commanded.

Very white tortilla flour can be made by the process of the invention starting with white corn, since darkening from exposure to oxygen at high temperature or other similar degradation is avoided.

An important aspect of the invention is avoiding the undesirable glossy surface on the flour particles produced by a hammermill or other positive pressure grinding mill. This creates a surface which is relatively less absorbent of moisture and which has an undesirable taste and color. Part of the difficulty is due to the high surface temperatures developed by the positive pressure grinding devices.

We have discovered that the inability to produce satisfactory tortilla flour by grinding in gas-borne streams is partially traceable to the fact that the cooking was not conducted in such a way as to obtain a satisfactory grain which could be ground in a gas stream without gelatinizing.

One advantage of the product of the invention is that the flour particles obtained are more uniform in size distribution and moisture content.

Grinding in accordance with the invention avoids localized overheating.

In the process of the invention, the overall treatment time is cut down with respect to prior art practice.

The product of the invention has high food value because the hulls are hydrolized and included in the flour, not being removed as in some prior practice, retaining high food value, and areg round and become part of the final flour.

In the present practice, the water used in cooking is not rejected but is reused in the next process so that proteins and polysaccharides which might be lost with the water are retained.

In accordance with the present invention the moisture content of the corn at the end of cooking need be only about 30%, which is considerably lower than in many of the prior art practices. This water, down to a residual moisture content of 12 or 13%, is removed partly during the gas-borne grinding, and partly by air in a fluidized bed or a gas lift which also cools the product.

The result of the process is an improved yield of nixtamalized corn meal per unit of weight of corn grains.

The raw material used in the process is corn in the form of kernels having a moisture content of about 12%. White corn is preferred, but yellow or other colors of corn may be used if desired.

Cooking can be carried out either in a batch operation or in a continuous operation.

Dry corn kernels are mixed with lime and with water for the cooking operation. The proportion of water to corn by weight is preferably 1:1 although it may be within a range of 0.7 to 1 to 1.

Sufficient lime is charged to give an initial pH of about 12.5. Calcium hydroxide is sparingly soluble and therefore it takes very little lime to produce this pH. There should be sufficient excess of lime so that at the end of the cooking when the corn is partially nixtamalized the pH in the cooking liquor will be between 7.8 and 9.5 and suitably about 8.

The best way to determine this exact quantity, since it varies with the particular corn, is to run a small pilot batch on the corn and determine the amount of lime required.

The water is charged at about 100° C. or whatever is the boiling temperature at the particular location in the atmosphere. Lime is charged into the water and the corn is added at room temperature. In usual practice the temperature in the bath drops to 90–95° C. on adding the corn. If necessary, however, the temperature at this point is adjusted by heating or cooling so that it will provide a temperature of 90–95° C. immediately on adding the corn. The temperature of 90–95° C. is maintained for a time of three to five minutes according to the age of the corn, preferably using the longer time for the older corn and the shorter time for the greener corn.

Immediately after the end of five minutes at the above temperature, the temperature is reduced to a temperature in the range between 65 and 78° C., and preferably about 75° C., and the temperature is held within this range for from 15 to 45 minutes and preferably from 15 to 30 minutes. The dropping of the temperature can be accomplished by a cooling jacket or by adding a small amount of cooler water and the temperature can be held at an adequate level so that it will not go below 65° C. by introducing steam condensate directly into the mass.

The reason for limiting the time at a temperature of 90–95° C. to not more than five minutes is that it is desired to heat the hull but not to have the heat penetrate extensively into the kernel as high temperature heating of the kernel is likely to gelatinize it and it would be impractical to grind in an air-borne stream as discussed herein if the kernel has been heated above the temperature of gelatinization, which is a little above 78° C.

This is accomplished in the batch technique by blowing air through the batch, the air not being harmful under those conditions because the hulls are still unbroken and protect the kernels from the effect of the oxygen. In the case, however, of continuous cooking mechanical agitation can be used, suitably a screw conveyor or other positive displacement device which will advance the grains and expose them for a predetermined time to a proper temperature.

At the end of the cooking, the corn is not washed in the preferred embodiment, but the cooking liquor is simply drained off and reused for the next cycle. It will be evident that the creation of soluble products such as proteins and polysaccharides which could be carried off in leaching water is avoided by the short cooking cycle and the control of the other factors incident to cooking, and of course the reuse of the cooking liquor restores to the system any minute quantity of soluble product.

The corn grains after cooking have built up their moisture from an initial level of about 12% to about 30%. This is compared to about 45% moisture at the end of cooking in prior art processes.

Several advantages occur from this cooking sequence as described above. A high temperature and high pH tends to decompose the hull so that water can penetrate without destroying the food value of the hull. The short time limit at the high temperature prevents gelatinizing the starch which would cause it to lose its favorable properties and would produce an unsatisfactory flour.

The more prolonged cooking at the lower temperature causes the alkaline water to be absorbed in the kernel and produces an average moisture content of about 30%.

During the cooking the lime reacts with the hull and tends to convert the hull to hemicellulose and it is for this reason that it is important to maintain a pH at the end of cooking of about 8, since an excessively high pH at the time will tend to color the product during drying.

Other actions take place during cooking. The gluten of the corn in which substantially all protein is present in the form of zein is hydrolyzed to make it more digestive and more nutritive. The reaction between the lime and the protein gives rise to the typical taste and color of properly nixtamalized tortilla flour, producing the organoleptic properties.

The germ and oil content of the kernel are concentrated in the upper part and they are first influenced by the temperature before the starch itself is affected.

Enzymes are inactivated and organic acids are neutralized. This tends to promote preservation of the final product and avoids rancidity which would occur by oxidation of unsaturated fats and acids. Fats tend to be saponified by the lime.

Once the cooking is complete, the next step is grinding. The cooked grains of corn are preferably first crushed or sliced as by knives, which can be similar to a household meat grinder. This cuts the kernels and distributes the moisture homogeneously throughout.

The crushed grains, if crushing is used, and the whole grains, if crushing is not used, are then discharged into a gas stream which causes one kernel or particle to impinge on another in a way that will cause fragmentation of the particles and eventually grind both the hulls and the kernels into flour.

The gas temperature should be between 232 and 316° C. The preferable gas used is superheated steam at a pressure of 100–275 p.s.i. and a temperature of about 230–288° C. Also, gas from products of combustion which does not contain more than 2% of uncombined oxygen, or carbon dioxide, nitrogen or any of the rather inert gases such as argon or helium may be used. It should be noted that it is not recommended to use a combustible gas, as there is an explosion hazard. The quantity of uncombined oxygen should be limited at about 2% because polysaccharides and proteins will react with oxygen at the temperatures in question to produce undesirable color and odor.

The operation in grinding is not simply one of grinding, but involves also partial drying. The moisture content at the time the corn particles leave the grinder is reduced from about 30% to 18–20% by weight.

The final ground powder suitably consists of a coarse fraction and a fine fraction. Good practice indicates that 40 to 45% of the flour is in the range between 50 and 100 mesh per linear inch, the balance being finer than 100 mesh per linear inch.

The fluid energy of the heated gas produces filamentary breaking along cell walls of the starch in the corn producing a large surface per unit weight which aids in moisture absorption without damaging the premeability of the cell. The grinding breaks up the particles into smaller particles without appreciable compacting. The superior results obtained in the grinding contribute immeasurably to the texture, plasticity and keeping qualities of the flour.

After completion of grinding, the flour is further dried, preferably by passing it through a fluidized bed or gas lift in which it can be subjected to air or other gas at a suitable temperature such as 54 to 60° C. and cooled at the same time, the resultant product being tortilla flour that has a moisture content of about 12%.

FIGURES 1, 2 and 3 show apparatus for carrying out the process of the invention continuously. Cooker 20 suitably provided with a positive screw conveyor 21 in a cylindrical housing 22, progresses the mass forward after introduction of water, lime and corn at 23. The temperature and rate of feed are controlled so that the corn grains are held at a temperature of 90–95° C. for three to five minutes, and then at a temperature of 65–78° C. for 15 to 45 minutes and preferably 15 to 30 minutes. The temperature control is accomplished by suitable heating and cooling jackets in the housing 22, such jackets not being separately shown.

At the end of the cooker 20 the cooking liquor is removed at 24 for reintroduction at 23, with added lime and added corn. The corn grains pass at 25 into a slicer 26 consisting of a cylindrical housing 27 provided at the relatively rearward end with a rotating screw feed 28 which builds up the required pressure on the corn grains. The corn grains are forced through openings 30 in a slicer plate 31 which on the rearward size is traversed by a rotating knife 32 as in a conventional domestic meat grinder.

After passing through the orifice plate 31 the sliced corn grains are progressed forward by a rotating screw conveyor 33 at the required rate to enter a gas-borne grinder 34. The grinder 34 suitably has a cylindrical interior chamber 35 which introduces a tangential stream of corn 36 borne by gas 37 heated to a temperature of between 230 to 316° C. and suitably at a pressure of at least 100 p.s.i. The stream of corn particles recycles repeatedly past the inlet at 38, the particles impinge against one another and fragment.

As the recycling takes place and grinding occurs also, the corn is dried reducing its moisture content from about 30% to about 20%. The ground particles are then withdrawn at 40 to a suitable separator 41. The entire material can go through the separator or there can be classification in the grinder as by centrifugal force, which is well known in the art and forms no part of the present invention. The separator 41 can conveniently be a cyclone separator. From the cyclone separator gas passes off at 42 and flour is withdrawn at 43 to a fluidized bed drier 44 having a fluidized bed 45 through which gas, suitably air, is introduced at 46, desirably at a temperature of about 54 to 60° C. which further dries the flour and removes additional moisture to a moisture content of about 12%. The flour is withdrawn from the top of the fluidized bed drier 44 at 47 to a bin 48 from which the flour passes through a classifying screen 51 to a packaging line 50. Excessively coarse particles are returned to the inlet to the grinder by pipe 51'.

FIGURE 4 illustrates a modification of the device of FIGURES 1 to 3. In this form cooking is accomplished in a reactor type cooker 20' where a batch operation is performed. The charge is accomplished at the top and the temperature is controlled as above described. For agitation air is blown in at 21'.

In this case after grinding the product from the separator 41 is withdrawn at 43 to a fluidized bed drier 44 and taken from there after drying to a bin 48 from which it is withdrawn at 51 to be classified as earlier explained.

FIGURE 4a illustrates a modification of FIGURE 4 or FIGURE 1, in which the product from the collector 41 is dried, suitably by introducing gas, preferably air, from a blower 49 into the stream of flour to propel it upwardly in a gas lift column 49' from which the entrained air and flour passes to bin 48 as above described.

The temperature of the gas in the gas lift will conform to the temperature of the gas in the fluidized bed as above described.

It will be evident, of course, that if the dough is to be made directly the drying process will be adjusted so that the correct moisture content for the dough remains in the flour.

FIGURE 5 illustrates in vertical section the modified form of grinder 34' in which the corn is introduced at 52 near the bottom where it is picked up by air streams 53 and carried around an oval path 54 in repeated cycles being eventually withdrawn past a classifier 55 to an outlet 56. This corresponds to a commercial piece of equipment, manufactured by Fluid Energy Processing and Equipment Company of Philadelphia, Pa., under the name of Jet O Mizer and described in their current catalogue. Other gas-borne pulverizers are well known in the art, including Majac Jet Pulverizer manufactured by Majac Inc. of Pittsburgh, Pa.

*Example 1*

The charge into the cooker is as follows:

White corn grains _____ lbs__ 400
Water _____ lbs__ 400
Caustic lime _____ grams__ 425

Cooking is carried on for five minutes at 94° C. and then for 30 minutes at 75° C. The apparatus of FIGURE 4 is used and air is blown through the mix sufficient to agitate the corn and make the temperature uniform. The corn as withdrawn from the cooker has a moisture content of 30%, contrasting to its initial moisture content of 12%. The corn is ground in the device of FIGURE 4 in a stream of superheated steam at a pressure in excess of 100 p.s.i. and at a temperature of 288° C. The corn is dried in the grinding to a moisture content of 20% by weight.

The corn is ground to 60 mesh per linear inch.

In the fluidized bed the moisture content of the corn is reduced to 12%.

The product is of good keeping quality and has the unusual properties discussed above.

*Example 2*

The operation of Example 1 is carried out in the apparatus of FIGURES 1 to 3 with similar results to that described in Example 1.

*Example 3*

The process of Example 1 is carried out except that the corn, being greener, is first treated in the cooker for only three minutes at 92° C.

The other operations are carried out as in Example 1 with similar results.

In all of the above, preliminary runs were made to establish the required quantity of lime so that at the end of cooking the pH in the cooking liquor was about 8.

In view of our invention and disclosure, variations and modifications to suit individual whim or particular need will doubtless become evident to others skilled in the art to obtain all or part of the benefits of our invention without copying the process shown, and we, therefore, claim all such insofar as they fall within the reasonable spirit and scope of our claims.

Having thus described our invention what we claim as new and desire to secure by Letters Patent is:

1. A process of producing tortilla flour, which comprises steeping whole grain corn in the presence of from 70–100% by weight of water based on the weight of the corn and in the presence of calcium oxide sufficient in quantity to react with the corn and partially nixtamalize it and to establish an initial pH in the bath of about 12.5 and a final pH in the bath during cooking of about 8, for a time of between 3 and 5 minutes at a temperature of between 90 and 95° C., further steeping the corn in the presence of said water and calcium oxide at a temperature of between 65 and 78° C. for a time sufficient to render the hull greasy without removing it, removing the grains from the water, the moisture content of the grains then being about 30%, introducing the grains into a stream of non-combustible gas at a pressure of between 100 and 275 p.s.i. at a temperature of between 230.2 and 310.6° C., and progressing the stream of corn grains in a return loop to form corn particles and to impinge the corn particles against other corn particles, grind the corn to produce flour and partially dry the flour, separating the gas from the flour, and then completing the drying of the flour to a moisture content of about 12%.

2. A process of claim 1, which comprises cutting the grains to expose the kernel after steeping and before introducing the grains into the gas stream.

3. A process of claim 1, which comprises steeping the corn grains in a batch and then discharging the batch into the gas stream.

4. A process of claim 1, which comprises continuously advancing the corn grains as they are steeped.

5. A process of claim 1, which comprises finally drying the flour by depositing it in a fluidized bed and projecting gas through the bed at a temperature below the temperature at which the flour enters the bed, thus cooling the flour.

6. A process of claim 1, which comprises finally drying the flour by gas lifting the flour at a temperature below the temperature at which the flour enters the gas lift, thus cooling the flour.

7. A process of claim 1, in which the gas has a content of uncombined oxygen not exceeding 2%.

8. A process of claim 1, in which the gas essentially comprises steam.

References Cited

UNITED STATES PATENTS 2,704,257  3/1955  De Sollano et al. _____ 99—93

RAYMOND N. JONES, *Primary Examiner.*